US006620333B2

(12) United States Patent
Brusasco et al.

(10) Patent No.: US 6,620,333 B2
(45) Date of Patent: *Sep. 16, 2003

(54) CO2 LASER AND PLASMA MICROJET PROCESS FOR IMPROVING LASER OPTICS

(75) Inventors: Raymond M. Brusasco, Livermore, CA (US); Bernardino M. Penetrante, San Ramon, CA (US); James A. Butler, Manteca, CA (US); Walter Grundler, Hayward, CA (US); George K. Governo, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 09/978,394

(22) Filed: Oct. 16, 2001

(65) Prior Publication Data

US 2002/0070198 A1 Jun. 13, 2002

Related U.S. Application Data

(60) Provisional application No. 60/242,496, filed on Oct. 23, 2000.

(51) Int. Cl.⁷ .............................. B08B 7/00; B44C 1/22
(52) U.S. Cl. .............................. 216/24; 216/26; 216/67; 216/80; 65/17.4; 219/121.6; 219/121.69; 427/579; 134/1
(58) Field of Search .............................. 216/24, 26, 38, 216/65, 67, 80; 65/17.4, 28, 31, 111, 120, 391, 392; 134/1; 219/121.6, 121.65–121.69; 427/578, 579

(56) References Cited

U.S. PATENT DOCUMENTS

| | | | |
|---|---|---|---|
| 4,390,393 A | 6/1983 | Ghezzo et al. | 156/643 |
| 4,667,101 A | 5/1987 | Siekhaus | 250/307 |
| 5,143,533 A | 9/1992 | Brusasco | 65/18.1 |
| 5,286,338 A * | 2/1994 | Feldblum et al. | 216/26 |
| 5,411,723 A * | 5/1995 | Morris | 423/306 |
| 5,472,748 A | 12/1995 | Wolfe et al. | 427/554 |
| 6,099,389 A | 8/2000 | Nichols et al. | 451/36 |
| 6,205,818 B1 * | 3/2001 | Seward, III | 65/33.2 |
| 6,518,539 B2 * | 2/2003 | Hackel et al. | 219/121.6 |
| 2002/0029956 A1 * | 3/2002 | Allen | 204/157.15 |

FOREIGN PATENT DOCUMENTS

WO    WO 01/54853 A2    8/2001    .......... B23K/26/00

OTHER PUBLICATIONS

Temple, P.A. et al "CO2–Laser Polishing of Fused Silica Surface for Increased Laser Damage Resistance at 1.06 um"; Bennett, H.E., ed., Damage in Laser Materials:1979, Nat. Bur. Stand. (U.S.) Spec. Publ. 568, pp 229–236, 1979.*
Koinuma, H. et al "Development and application of a microbeam plasma generator" Appl Phys Lett 60 (7) 816–817, Feb. 1992.*
Weber, A. J. et al, "An Investigation of Laser Processing of Silica Surfaces" Bennett, H.E., ed, Damage in Laser Materials: 1986, NIST (U.S.) Spec. Publ. 752, pp. 542–556, 1987.*
Jeong, J.Y. et al "Etching materials with an atmospheric–pressure plasma jet" Plasma Sources Sci Technol 7 (3) 282–285, 1998.*
Babayan, S.E. et al "Deposition of silicon dioxide filmes with an atmospheric–pressure plasma jet" Plasma Sources Sci. Technol. 7 (3) 286–288, 1998.*

* cited by examiner

Primary Examiner—Anita Alanko
(74) Attorney, Agent, or Firm—Eddie E. Scott; Alan H. Thompson

(57) ABSTRACT

A optic is produced for operation at the fundamental Nd:YAG laser wavelength of 1.06 micrometers through the tripled Nd:YAG laser wavelength of 355 nanometers by the method of reducing or eliminating the growth of laser damage sites in the optics by processing the optics to stop damage in the optics from growing to a predetermined critical size. A system is provided of mitigating the growth of laser-induced damage in optics by virtue of very localized removal of glass and absorbing material.

23 Claims, 7 Drawing Sheets

CO2 LASER AND PLASMA MICROJET PROCESS FOR IMPROVING LASER OPTICS

CROSS-REFERENCE TO RELATED APPLICATIONS

This application claims the benefit of U.S. Provisional Application No. 60/242,496 by Raymond M. Brusasco, Bernardino M. Penetrante, James A. Butler, Walter Grundler, and George K. Governo, filed Oct. 23, 2000, and entitled "CO2 Laser and Plasma Microjet Process for Improving Laser Optics," which is incorporated herein by this reference.

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of Endeavor

The present invention relates to optics and more particularly to a system that mitigates the growth of damage in an optic.

2. State of Technology

U.S. Pat. No. 4,667,101 for predicting threshold and location of laser damage on optical surfaces by Wigbert Siekhaus, patented May 19, 1987 provides the following description, "Modern day applications of laser devices call for increasingly powerful and precise beams. Such applications require high resolution optical devices such as lenses, filters, and mirrors. The application of large intensities of laser energy to these devices frequently destroys them during operation. Often the level of intensity required for experimental applications (such as the Projects Nova and Novette at the Lawrence Livermore National Laboratory) is so high that pretesting of the optical device at the required intensities would be impractical. The level of effort required to prepare for and execute the desired experiments, however, is very high and so an effective means of pretesting such devices is desirable. Presently there are no commercially available devices capable of "stress testing" a particular optical device. U.S. Pat. No. 3,999,865, issued Dec. 28, 1976 to Milam et al., teaches an instrument capable of analyzing the cause of damage to optical devices. It provides for subjecting the device to a damaging energy and intensity and then analyzing the damage from the standpoint of time and applied power in order to determine the one or more of several reasons for the laser induced damage. While Milam is helpful in improving system design or production techniques, it requires that damage actually occur and only indirectly identifies flaws through analysis of the parameters of the damaging event. The tested device clearly can no longer be used."

U.S. Pat. No. 5,143,533 for a method of producing amorphous thin films by Raymond M. Brusasco, patented Sep. 1, 1992 provides the following description, "Disclosed is a method of producing thin films by sintering which comprises: a. coating a substrate with a thin film of an inorganic glass forming parulate material possessing the capability of being sintered, and b. irridiating said thin film of said particulate material with a laser beam of sufficient power to cause sintering of said material below the temperature of liquidus thereof. Also disclosed is the article produced by the method claimed."

U.S. Pat. No. 5,472,748 for permanent laser conditioning of thin film optical materials by Wolfe et al., patented Dec. 5, 1995, provides the following description: "The performance of high peak power lasers, such as those used for fusion research and materials processing, is often limited by the damage threshold of optical components that comprise the laser chain. In particular, optical thin films generally have lower damage thresholds than bulk optical materials, and therefore thin films limit the output performance of these laser systems. Optical thin films are used as high reflectors, polarizers, beam splitters and anti-reflection coatings. The Nova project at Lawrence Livermore National Laboratory is designed to study the use of lasers to produce fusion by inertial confinement. The 1.06 $\mu$m wavelength Nova laser output is limited, in part, by the damage threshold of large aperture (approximately 1 m diameter) dielectric thin films coated on flat substrates. Proposed future fusion lasers require optical coatings with laser induced damage thresholds that exceed a fluence of 35 J/cm 2 in 10 ns pulses at the 1.06 $\mu$m wavelength. Fluence is defined in the specification and claims for a pulsed laser of a specified wavelength and specified pulse length as the energy per unit area delivered by a single pulse. Prior to the invention, the highest damage thresholds were in the range from 10–20 J/cm2 in a 10 ns pulse at the 1.06 $\mu$m wavelength. Therefore, a method of increasing the laser damage threshold of dielectric optical thin films (or coatings) is needed."

U.S. Pat. No. 5,796,523 for a laser damage control for optical assembly by John M. Hall, patented Aug. 18, 1998 provides the following description, "Protection methods and apparatus for optical equipment have been attempted for providing protection from laser energy that could otherwise damage optical radiation detectors, including the human eye. The most common technique of providing protection involves optical filtering elements, which offer substantial protection but only over a limited, fixed spectral color range. Standard dielectric coatings are the most common form of filters, and flat plates with these "notch" coatings can be easily inserted into or outside many common optical assemblies. As noted above, however, these filters are useful only over a limited range of wavelengths, and also have the added disadvantage of blocking even non-harmful radiation within the designed spectral region. Typical military magnifying optical assemblies such as telescopes, periscopes, and binoculars vary widely, and typically have magnifying powers ranging from 4×to 10×, with entrance aperture diameters going from 20 mm to 60 mm or more. As the magnifying power increases, the angular resolution increases, and thus the farther away a given target can be recognized. The larger apertures are required to gather sufficient light energy to allow good contrast for far-away targets. These magnifying optical systems are commonly designed for use with the human eye, but can also easily perform similar tasks when connected to standard television camera equipment. Given the harsh nature of military environments, these optical systems do not lend themselves easily to the use of attachments to perform laser protection functions. All magnifying optical assemblies of the kind found in telescopes, periscopes, and binoculars can be characterized as consisting of an objective lens set, followed by an eyepiece assembly, with either a real or virtual focal plane between, as well as a variety of intervening prism assemblies (almost always porro prisms) to keep the image orientation proper. The magnifying power is defined as the ratio of the objective focal length divided by the eyepiece focal length. Typical fields of view for these systems range from 2° to 10°, depending upon the magnification. In the prior art for all these systems, the focal planes between the objective and eyepiece sections, or between any intervening relay optics, is not well corrected for aberrations. This does not affect the overall system performance, because the aberrations of the objective can be compensated by those of the eyepiece. It is much more difficult to design both objective and eyepiece optics to each have diffraction limited focal planes, and therefore this feature is not normally embraced by the current art. Additionally, since the magnifying power is the ratio of the objective and eyepiece focal lengths, it is desirable to have a relatively short focal length eyepiece to minimize the objective focal length for a given magnification. This reduces the overall size of the system, but does not offer much room between the eyepiece assembly and the intermediate focal plane. Because of this, prior art designs do not usually allow elements other than thin transmissive reticle plates to occupy the space in or near the intermediate focal plane. The prior art in developing laser protective devices offers many techniques, including sacrificial mirrors, transmissive optical power limiters, liquid cells, etc. These devices are generally designed to operate passively within an optical system until indicent optical radiation is of sufficiently high energy to activate the protective mechanism. In order to set the activation threshold below the damage threshold of the detector (human eye, TV camera, etc.), it is desirable to place the power limiter in or near a well corrected, diffraction limited focal plane. Additionally, the optical system must be able to accommodate the volume of the power limiter device, and be able to provide proper image orientation should the device create an image translation."

U.S. Pat. No. 6,099,389 for fabrication of an optical component by Nichols et al., patented Aug. 8, 2000, provides the following description: "A method for forming optical parts used in laser optical systems such as high energy lasers, high average power lasers, semiconductor capital equipment and medical devices. The optical parts will not damage during the operation of high power lasers in the ultra-violet light range. A blank is first ground using a fixed abrasive grinding method to remove the subsurface damage formed during the fabrication of the blank. The next step grinds and polishes the edges and forms bevels to reduce the amount of fused-glass contaminants in the subsequent steps. A loose abrasive grind removes the subsurface damage formed during the fixed abrasive or "blanchard" removal process. After repolishing the bevels and performing an optional fluoride etch, the surface of the blank is polished using a zirconia slurry. Any subsurface damage formed during the loose abrasive grind will be removed during this zirconia polish. A post polish etch may be performed to remove any redeposited contaminants. Another method uses a ceria polishing step to remove the subsurface damage formed during the loose abrasive grind. However, any residual ceria may interfere with the optical properties of the finished part. Therefore, the ceria and other contaminants are removed by performing either a zirconia polish after the ceria polish or a post ceria polish etch."

International Patent Application Number WO 01/54853 for a method and apparatus for repair of defects in materials with short laser pulses by Paul, B. Corkum et al., published Aug. 2, 2001, provides the following information, "Typically, a method of laser repair requires two key steps— locating defects precisely and controlling the laser beam to impact only on the places where defects are detected. Simple though these requirements appear, it is often difficult to achieve both. For example in repairing some electronic or optoelectronic devices, some defects and/or the effect of the defects are not easily identified until the devices are activated. Since laser beam repair devices often operate on wafers to correct identified problems, activating individual devices is not a trivial task."

SUMMARY OF THE INVENTION

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention relates to a system of reducing or eliminating the growth of laser-induced damage sites in optics upon continued irradiation with high peak power lasers with wavelengths ranging from the infrared to the ultraviolet. The invention also relates to a method of reducing or eliminating the density of laser-induced damage initiation sites in optics upon continued irradiation with high peak power lasers with wavelengths ranging from the infrared to the ultraviolet.

The present invention provides a glass optic for operation at the fundamental Nd:YAG laser wavelength of 1.06 micrometers through and including the tripled Nd:YAG laser wavelength of 355 nanometers produced by the method of reducing or eliminating the growth of laser damage sites in the optics by processing the optics to stop damage in the optics from growing to a predetermined critical size. One embodiment is produced by etching the damage sites with an electrical discharge plasma. Another embodiment is produced by local removal of glass and absorbing material via electrical discharge plasma etching. Another embodiment is produced by removing local surface height variations in the area and rendering the area more smooth by use of electrical discharge plasma etching. Another embodiment is produced by elimination of cracks emanating from the initial laser damage sites performed by chemical etching of the glass material matrix by electrical discharge plasma etching. Another embodiment is produced by imposing compressive stress into the uppermost layer of the optics and rendering flaws within the compressive stress layer in such a state that they may not grow. Another embodiment is produced by local removal of glass and absorbing material via carbon dioxide laser irradiation. Another embodiment is produced by depositing silica on the damage sites with an electrical discharge plasma. Another embodiment is produced by illuminating the damage sites using a small aperture $CO_2$ laser beam. In another embodiment the beam delivers up to 200 watts of power in a beam up to 10 mm in diameter. In another embodiment the beam is focused into an area between 20 and 1500 microns in diameter. In another embodiment the beam has a beam spatial profile that is smooth Gaussian. In another embodiment the beam possess a beam power stability of $\leq 1\%$.

An embodiment of the present invention is useful in that the embodiment permanently reduces or eliminates the growth of laser-induced damage sites in optics upon continued irradiation at the laser wavelength of 1.06 micron through and including the tripled wavelength of 0.35 micron.

Another embodiment of the present invention is useful in that the embodiment reduces the density of damage initiators in glass optics by preinitiating damage on the said optics with a 0.35-micron laser and then reducing or eliminating the growth of the preinitiated damage site on the said optics.

Another embodiment of the present invention is useful in that the embodiment provides a method and apparatus for reducing or eliminating the growth of laser-induced damage sites in large-aperture glass optics upon continued irradiation at the laser wavelength of 1.06 micron through and including the tripled wavelength of 0.35 micron.

Another embodiment of the present invention is useful in that the embodiment provides a process of mitigating laser-induced damage growth in glass optics by virtue of very localized removal of glass and absorbing material. The invention is also a process of mitigating laser-induced damage growth in glass optics by virtue of modification of the local structure of the glass in the affected area. Another embodiment of the present invention is useful in that the embodiment provides a process of mitigating laser-induced damage growth in glass optics by virtue of elimination of cracks emanating from the initial damage site. Another embodiment of the present invention is useful in that the embodiment provides a process of mitigating laser-induced damage growth in glass optics by virtue of removing local height variations in the affected area and rendering the affected area smoother.

Other embodiments of the present invention are useful in that the embodiments provide at least three methods for local treatment of the damage site:

Etching the damage site with an electrical discharge plasma.

Depositing silica on the damage site with an electrical discharge plasma.

Illuminating the damage site using a small aperture $CO_2$ laser beam.

The present invention provides method of reducing or eliminating the growth of laser damage sites in optics for optics that are expected to subsequently be operated at the fundamental Nd:YAG laser wavelength of 1.06 micrometers through and including the tripled Nd:YAG laser wavelength of 355 nanometers. The method includes the steps of processing the optics to stop damage in the optics from growing to a predetermined critical size. In one embodiment the damage sites are etched with an electrical discharge plasma. Another includes local removal of glass and absorbing material via electrical discharge plasma etching. Another embodiment includes mitigating the growth of laser damage sites in optics by virtue of modification of the local structure of the glass in the affected area, removing local surface height variations in the area, and rendering the area more smooth by use of electrical discharge plasma etching. Another embodiment includes mitigating the growth of laser damage sites in optics by virtue of elimination of cracks emanating from the initial laser damage sites performed by chemical etching of the glass material matrix by electrical discharge plasma etching. Another embodiment includes mitigating the growth of laser damage sites in optics by virtue of modification of the local distributions of stress in the glass matrix by imposing compressive stress into the uppermost layer of the optics and rendering flaws within the compressive stress layer in such a state that they may not grow. Another embodiment includes local removal of glass and absorbing material via carbon dioxide laser irradiation. Another embodiment includes mitigating damage in optics by virtue of elimination of cracks emanating from the initial laser damage sites performed by irradiation of the local area with a carbon dioxide laser. Another embodiment includes depositing silica on the damage sites with an electrical discharge plasma. Another embodiment includes illuminating the damage sites using a small aperture $CO_2$ laser beam. Another embodiment includes delivering up to 200 watts of power in a beam up to 10 mm in diameter. Another embodiment includes focusing the beam into an area between 20 and 1500 microns in diameter. In another embodiment the beam has a beam spatial profile that is smooth Gaussian. In another embodiment the beam has a beam possess a beam power stability of $\leq 1\%$. In another embodiment the focus and power level of the $CO_2$ laser is adjusted to produce treatment pits as shallow as tenths of a micron and diameters of less than a hundred microns. In another embodiment the damage sites are etched with an electrical discharge plasma and operating at the fundamental Nd:YAG laser wavelength of 1.06 micrometers through and including the tripled Nd:YAG laser wavelength of 355 nanometers.

In one embodiment a laser method is provided including the steps of irradiation of the local area with a carbon dioxide laser and operating at the fundamental Nd:YAG laser wavelength of 1.06 micrometers through and including the tripled Nd:YAG laser wavelength of 355 nanometers. Another embodiment includes scanning the optics to initiate small-scale damage sites and removing nanoscale impurities. The impurities are expelled by production of the damage sites with photon absorbing components and curing the damaged sites by smoothing out the damage sites photon absorbing components, annealing any cracks, and eliminating any absorbing species that could cause damage growth.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
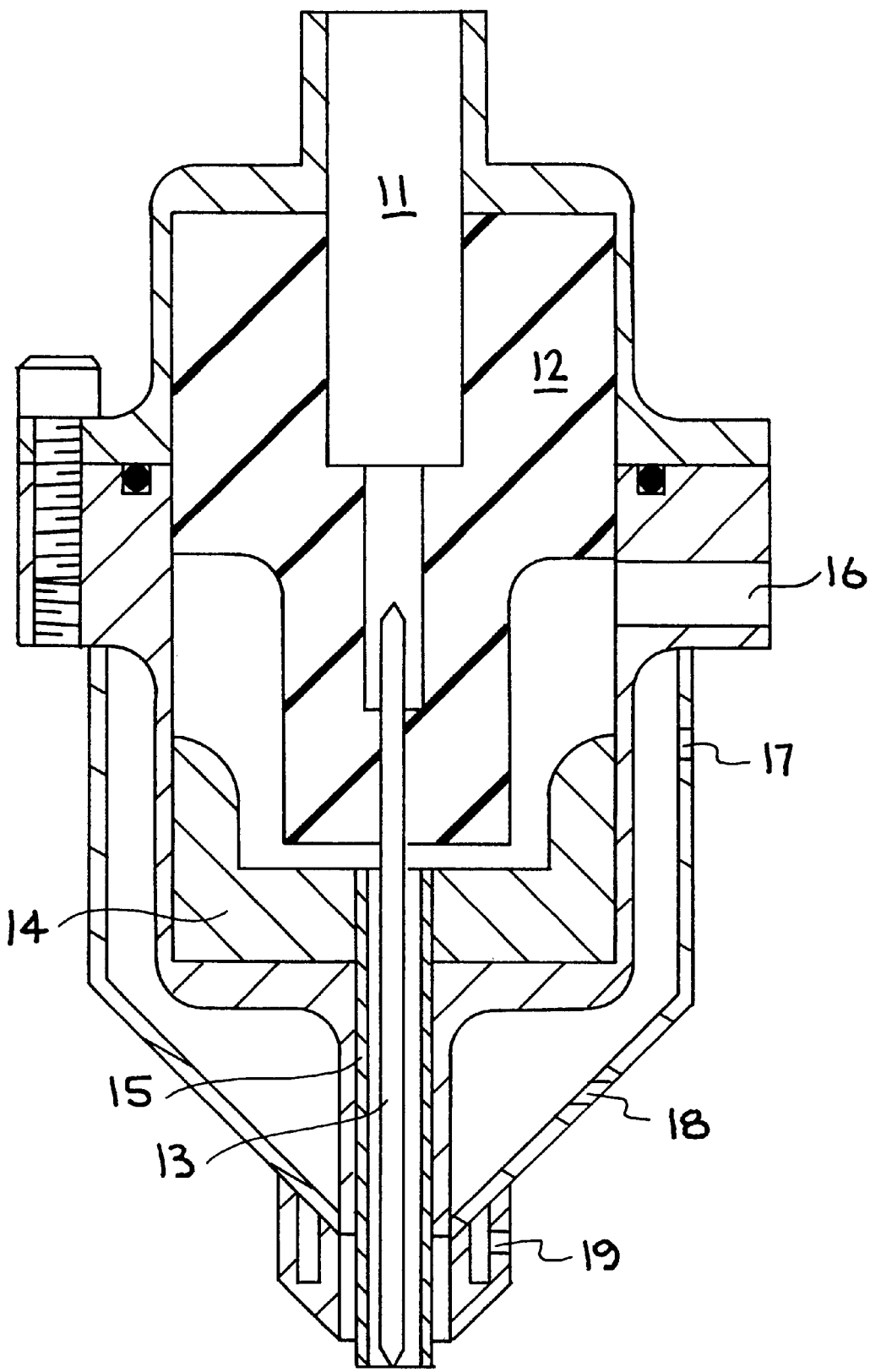
FIG. 1 is a schematic of the plasma microjet apparatus.

Referring now to the drawings, to the following detailed information, and to incorporated materials; a detailed description of the invention, including specific embodiments, is presented. The detailed description serves to explain the principles of the invention. The invention is susceptible modifications and alternative forms. The invention is not limited to the particular forms disclosed. The invention covers all modifications, equivalents, and alternatives falling within the spirit and scope of the invention as defined by the claims.

High power is defined as the level of power sufficient to initiate damage, or cause the growth of existing damage, on an irradiated optic with a probability of 0.001 percent or greater. For example, if the total number of irradiated laser pulses over a given area of an optic at a certain power is $10^6$ (1 million), then the power is high if 10 of those laser pulses cause damage anywhere over that area. Another example, if it is desired that an optic survive exposure for a total number of $10^6$ laser pulses, then the power is high if the first damage occurs before $10^5$ pulses. Another example, if an optic is being irradiated over an area of 1000 $cm^2$, then the power is high if the area of initiated damage or grown damage on the optic is 0.01 $cm^2$ or larger.

The sustained performance of high peak power lasers, such as those used for fusion research, is limited by the damage of optical components that comprise the laser chain. The damage initiates in small size, on the order of tens of microns, depending on the peak fluence of the laser. The growth of the damage is exponential in number of shots and can create excessive scatter and beam modulation. Replacing the damaged optics is an option for sustained performance of the laser system, but this option is very expensive. Therefore, a method of reducing or eliminating the growth of the damage sites is needed. A method of reducing or eliminating the number of sites that initiate damage is also desirable.

The largest and most powerful lasers designed for achieving thermonuclear ignition will operate with wavelengths ranging from the infrared (1.06-micron wavelength) to the ultraviolet (0.35-micron wavelength). In the final optics stage, the infrared beams will be converted to ultraviolet beams, and then focused to the target. The final optics will be irradiated by a distribution of fluences, peaking at a fluence of 15 $J/cm^2$, 3 nanosecond pulse duration at 0.35-micron wavelength. Fluence is defined in the specification and claims for a pulsed laser of a specified wavelength and specified pulse length as the energy per unit area delivered by a single pulse.

Glass optics, particularly made of fused silica, are essential for conditioning the laser beams and delivering these beams to the target. These optics suffer from weakened areas that are prone to damage at the laser fluences contemplated in the aforementioned laser systems. Damage can occur at the fundamental laser wavelength of 1 micron and, especially, at the tripled wavelength of 0.35 micron. There are two options that would enable continued use of the glass optics. One option is to stop the growth of the damage sites before they can create excessive scatter and beam modulation. The other option is to prevent the occurrence of damage initiation. Prior to this invention, there has been no method that has proven to be completely effective at stopping the growth of damage sites in fused silica at fluences greater than 10 $J/cm^2$ and especially for 0.35-micron beams. Such a method has been discovered in this invention. The method for stopping damage growth can also be applied for preventing the initiation of new damage sites.

The present invention provides method of reducing or eliminating the growth of laser damage sites in optics for optics that are expected to subsequently be operated at the fundamental Nd:YAG laser wavelength of 1.06 micrometers through and including the tripled Nd:YAG laser wavelength of 355 nanometers. The method includes the steps of processing the optics to stop damage in the optics from growing to a predetermined critical size. In one embodiment the damage sites are etched with an electrical discharge plasma. Another includes local removal of glass and absorbing material via electrical discharge plasma etching. Another embodiment includes mitigating the growth of laser damage sites in optics by virtue of modification of the local structure of the glass in the affected area, removing local surface height variations in the area, and rendering the area more smooth by use of electrical discharge plasma etching. Another embodiment includes mitigating the growth of laser damage sites in optics by virtue of elimination of cracks emanating from the initial laser damage sites performed by chemical etching of the glass material matrix by electrical discharge plasma etching. Another embodiment includes mitigating the growth of laser damage sites in optics by virtue of modification of the local distributions of stress in the glass matrix by imposing compressive stress into the uppermost layer of the optics and rendering flaws within the compressive stress layer in such a state that they may not grow. Another embodiment includes local removal of glass and absorbing material via carbon dioxide laser irradiation. Another embodiment includes mitigating damage in optics by virtue of elimination of cracks emanating from the initial laser damage sites performed by irradiation of the local area with a carbon dioxide laser. Another embodiment includes depositing silica on the damage sites with an electrical discharge plasma. Another embodiment includes illuminating the damage sites using a small aperture $CO_2$ laser beam. Another embodiment includes delivering up to 200 watts of power in a beam up to 10 mm in diameter. Another embodiment includes focusing the beam into an area between 20 and 1500 microns in diameter. In another embodiment the beam has a beam spatial profile that is smooth Gaussian. In another embodiment the beam has a beam possess a beam power stability of $\leq 1\%$. In another embodiment the focus and power level of the $CO_2$ laser is adjusted to produce treatment pits as shallow as tenths of a micron and diameters of less than a hundred microns. In another embodiment the damage sites are etched with an electrical discharge plasma and operating at the fundamental Nd:YAG laser wavelength of 1.06 micrometers through and including the tripled Nd:YAG laser wavelength of 355 nanometers.

An embodiment of the present invention was conceived as a method to treat laser optics with damage sites that, upon further irradiation, especially at 0.35-micron wavelength, would grow quickly in size to unacceptable levels. Since the initial damage sites would not otherwise be a significant performance limiting issue, the problem is to arrest the growth of these damage sites.

The laser-induced damage sites are hypothesized to contain any combination, singly or in multiple, of a number of detrimental materials, such as reduced silica (SiOx) or silicon (Si), impurities (foreign polishing compound, metals) and defective morphologies, such as rubble (shattered silica) and cracks. Consequently, removal of these undesirable materials and morphologies was warranted. The prior art suggested that etching of the silica surface in a highly localized manner would be useful in removing these undesirable elements. Koinuma et al. (H Koinuma, H Ohkubo, T Hashimoto, K Inomata, T Shiraishi, A Miyanaga, and S Hayashi, "Development and application of a micro-beam plasma generator," Appl. Phys. Lett. 60 (1992) 816–817.) describe an atmospheric-pressure plasma microjet apparatus conceived for etching of silicon in semiconductor manufacture. Since silicon (Si) etches much faster than silica ($SiO_2$), it should be possible to remove undesirable reduced species from the optics surface quickly and locally. The rates and spatial extent of atmospheric-pressure plasma etching are also discussed by Jeong et al. (J Y Jeong, S E Babayan, V J Tu, J Park, I Henins, R F Hicks, and G S Selwyn, "Etching materials with an atmospheric-pressure plasma jet," Plasma Sources Sci. Technol. 7 (1998) 282–285.) Similarly, deposition of silica can also be performed, as described by Babayan et al. (S E Babayan, J Y Jeong, V J Tu, J Park, G S Selwyn, and R F Hicks, "Deposition of silicon dioxide films with an atmospheric-pressure plasma jet," Plasma Sources Sci. Technol. 7 (1998) 286–288.) In this case, it would be possible to restore the surface of the optic to its pristine condition by first removing the offending material, by any convenient means, and then refilling the removed area with silica glass by a plasma deposition technique. Note that both plasma etching and plasma deposition are possible at atmospheric pressure.

Laser irradiation of materials has been found, in some cases, to be beneficial to the enhancement of the laser damage performance of laser optics. Wolfe et al. (C. R. Wolfe, M. R. Kozlowski, J. H. Campbell, M. Staggs and F. Rainer), in their patent, describe a method by which a multilayer dielectric coating is irradiated with a sub-damaging fluence of the operational wavelength, U.S. Pat. No. 5,472,748, dated Dec. 5, 1995, title, "Permanent laser conditioning of thin film optical materials." The disclosure of this patent is incorporated herein in its entirety by this reference. This process does not appear to significantly change the morphology or remove impurities but does positively affect the resultant laser damage threshold. Similarly, it has been reported by Siekhaus (W. Siekhaus, "Predicting threshold and location of laser damage on optical surfaces," U.S. Pat. No. 4,667,101 dated May 19, 1987) that continued, sub-damaging laser irradiation results in improvements in the laser damage threshold. The disclosure of this patent is incorporated herein in its entirety by this reference. Brusasco (R. M. Brusasco, "Method of Producing Amorphous Thin Films," U.S. Pat. No. 5,143,533 dated Sep. 1, 1992) has described a method for irradiating silica optics with a laser wavelength that strongly couples to the optical substrate. The disclosure of this patent is incorporated herein in its entirety by this reference.

The 10.6-micron wavelength radiation from a $CO_2$ laser is absorbed within the top 8–10 microns of the silica surface, resulting in rapid and local intense heating of the surface. As it is possible to evaporate silica, it was thought that such evaporation would serve to smooth the morphology of the damage site as well as excavate and remove the offending foreign materials therein. Finally, the high local heating may allow any agglomerated absorbing material to be dispersed in the glass media below, rendering them effectively harmless. The combination of a $CO_2$ laser evaporation technique with a plasma microjet etching and deposition technique seemed likely to afford the best possible method to stop the growth of the laser-induced damage sites on fused silica optics.

In the technology area of silicon wafer processing, laser annealing of fine surface defects is reported in the patent by Robinson et al. G. T. Robinson, O. B. Cecil, and R. R. Shah, "Method for removal of minute physical damage to silicon wafers by employing laser annealing," U.S. Pat. No. 4,390,393 dated Jun. 28, 1983) In the aforementioned patent, the fundamental wavelength (1.06 microns) of a Nd:YAG laser is used to effect the surface treatment conditioning. In terms of the mitigation of laser damage, use of the fundamental Nd:YAG wavelength has been found to be effective in increasing the laser damage threshold of multilayer dielectric stacks used as an optical reflector.[4] However, the fundamental Nd:YAG wavelength has not been shown to be effective at raising the laser damage threshold or in mitigating the growth of laser damage in bare optics.

Use of a $CO_2$ laser to cause deeper annealing of the wafer is also reported in the Robinson et al. patent and is shown to be effective in reducing the flaw density in the wafer. However, it is not obvious from the patent information that such flaw reduction would be possible in glass optics used for lasers or that such flaw reduction, if realized, would lead to a reduction in the laser damage initiation density or the stoppage of growth of laser damage in said glass optics.

Temple et al. (P. A. Temple, D. Milam and W. H. Lowdermilk, "$CO_2$ laser polishing of fused silica surfaces for increased damage resistance at 1.06 $\mu$m," National Bureau of Standards Special Publication 568 (1979) 229–236.) has reported the use of a $CO_2$ laser for treating bare fused silica surfaces to increase the resistance to laser-induced damage at the 1.06-micron wavelength. The method involves treating the entire surface with a $CO_2$ laser prior to exposure to a 1.06-micron laser. It was shown that the $CO_2$ laser processing causes the removal of a uniform layer of fused silica and a probable refusing of existing subsurface fractures. The method was shown to increase the fluence threshold at which surface damage by the 1.06-micron laser is induced. It is not obvious from the report that such increased damage resistance would also be possible at the 0.355 wavelength at fluences greater than 10 $J/cm^2$. Furthermore, when $CO_2$ laser processing is applied to the entire surface of a large aperture fused silica optics, the internal stress increases significantly (A. J. Weber, A. F. Stewart, G. J. Exarhos and W. K. Stowell, "An investigation of laser processing of silica surfaces," National Institute of Standards and Technology Special Publication 752 (1986) 542–556.). It is desirable to minimize this internal stress or minimize the area of the surface at which internal stress may develop.

An embodiment of the present invention consists of a $CO_2$ laser apparatus, capable of delivering up to 200 watts of power in a beam up to 10 mm in diameter. Appropriate optics are used to steer and focus the beam into an area between 20 and 1500 microns in diameter. The beam spatial profile must be a smooth Gaussian and the laser must possess a beam power stability of $\leq 1\%$.

The design of the plasma microjet reactor is shown in FIG. 1. The reactor is powered through an RF feed 11. A Teflon insulator 12 isolates the RF feed from the rest of the reactor. The RF feed is connected to a center electrode 13. A high temperature insulator 14 holds the center electrode 13 in place within the outer quartz tube 15. A 0.125-inch hole 16 is used for gas line. A 0.25-inch hole 18 is used for feeding in a coolant liquid to keep the electrodes cool. Another 0.25-inch hole 17 is used for cycling out the coolant fluid. An optional 0.125-inch hole 19 is used for a gas shield in order to reduce the mixing of surrounding air with the flame gas from the reactor.

Figure 2:
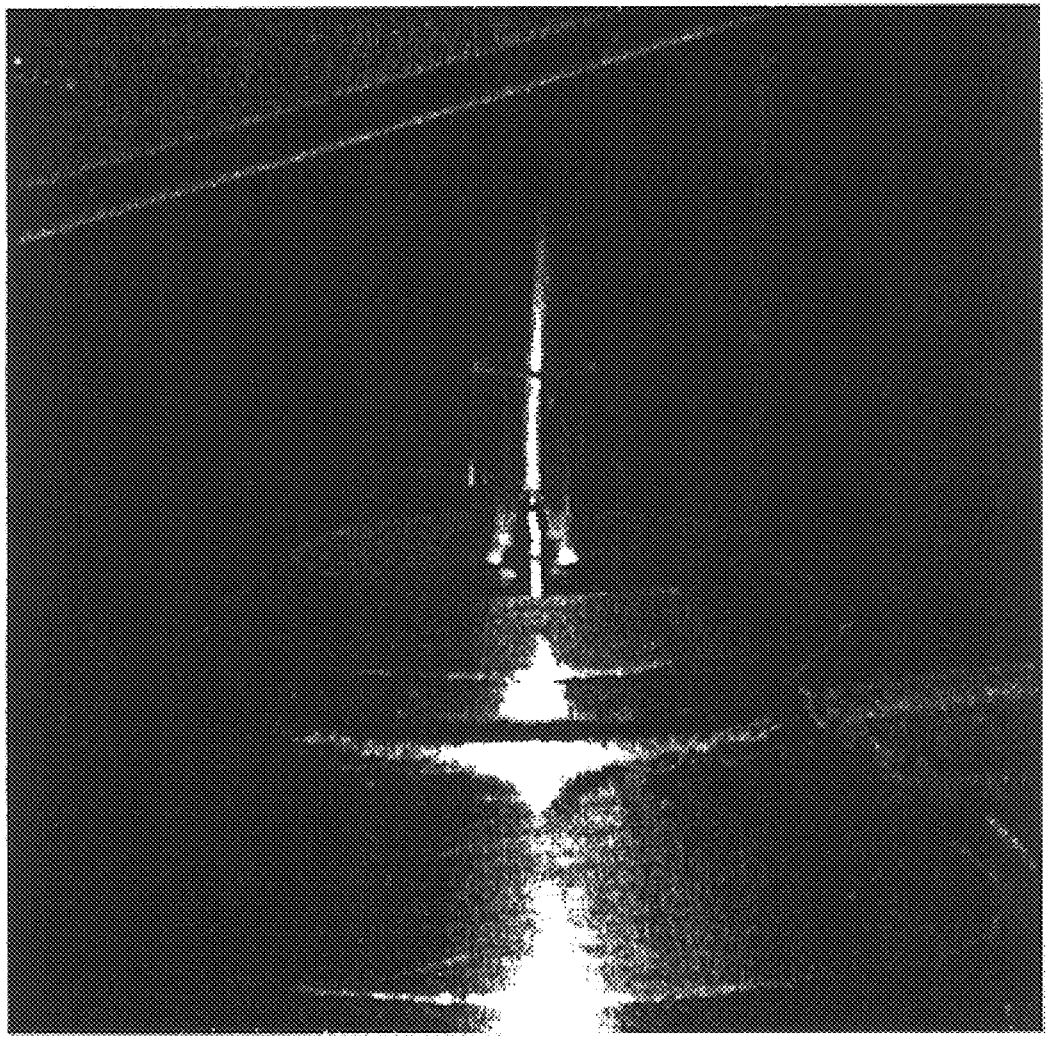
FIG. 2. is a photograph of the plasma microjet flame.

The flame produced by this apparatus is shown in FIG. 2. A dilute mixture of $CF_4$ in Argon is used for etching. To avoid any carbon contamination, a dilute mixture of $NF_3$ in Argon or Helium is used. For deposition of $SiO_2$, compounds like tetraethoxysilane (TEOS) or hexamethyldisiloxane (HMDSO) is used in the plasma.

Figure 3:
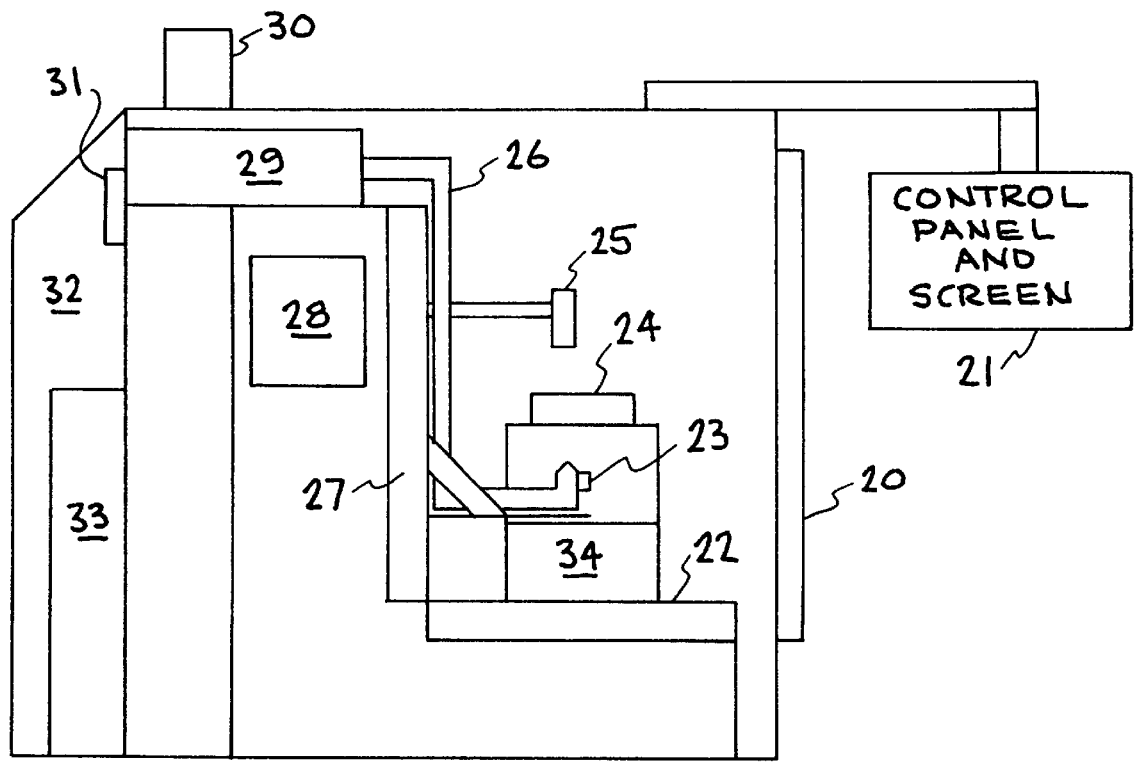
FIG. 3. is a schematic of the $CO_2$ laser and plasma microjet system for treating an optics held by a stage.

A stage is required for holding and transporting the optics to be treated and must be capable of translating the optics to precise, predetermined coordinates of the offending areas. A schematic of the system consisting of the $CO_2$ laser and plasma microjet along with the stage holding the optics to be treated is shown in FIG. 3. The various components of the system are identified by the following reference numerals: access doors 20, control panel and screen 21, Y axis 22, plasma jet 23, NIF lens 24, CCD camera 25, telescoping tube 26, Z axis 27, mass flow controller 28, $CO_2$ laser 29, vent 30, 5-way panel 31, gas cabinet 32, $NF_3$ mix 33, and X axis 34.

Figure 4:
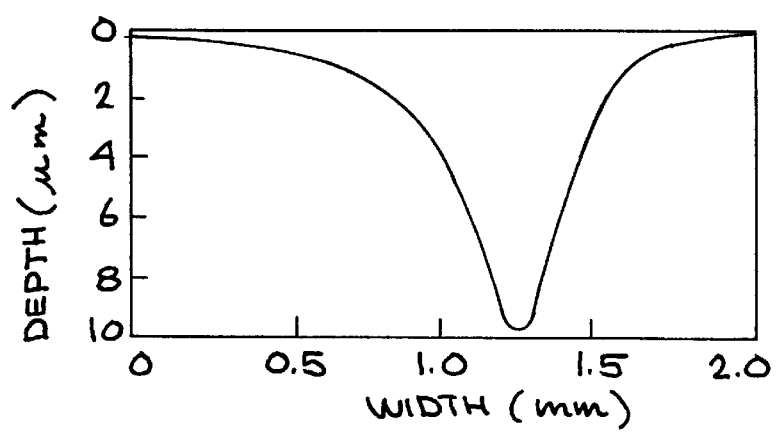
FIG. 4. shows a profile of a site fused $SiO_2$ that was etched by the plasma microjet.

The effect of plasma microjet etching on a bare fused $SiO_2$ substrate is shown in FIG. 4. This plasma etching procedure can be used to smooth out a damage site that consists of multiple pits.

Figure 5:
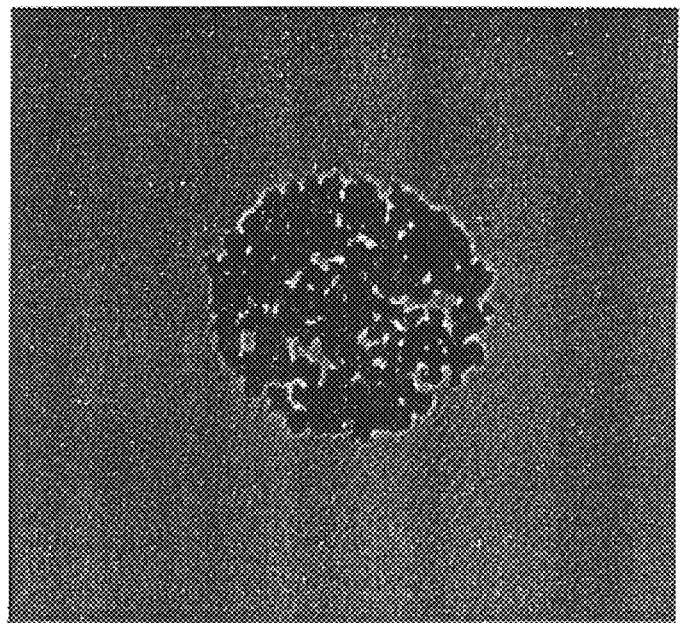
FIG. 5. is a picture of a damage site in $SiO_2$ consisting of multiple damage pits.
Figure 6:
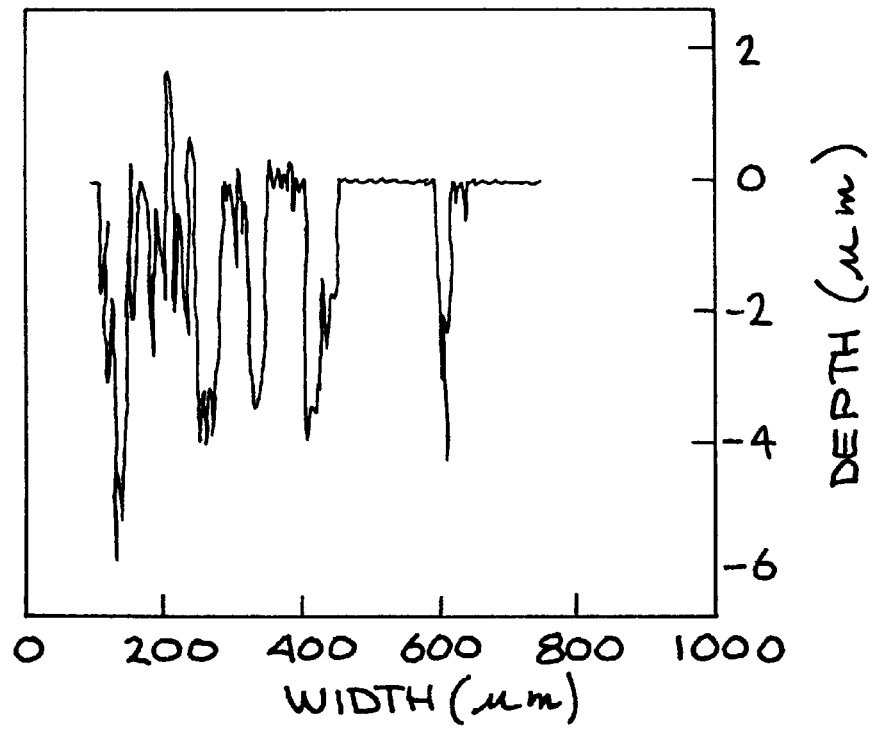
FIG. 6. illustrates a profile of the damage site shown in FIG. 5.

A picture of a typical damage site is shown in FIG. 5. The profile of this site is shown in FIG. 6.

Figure 7:
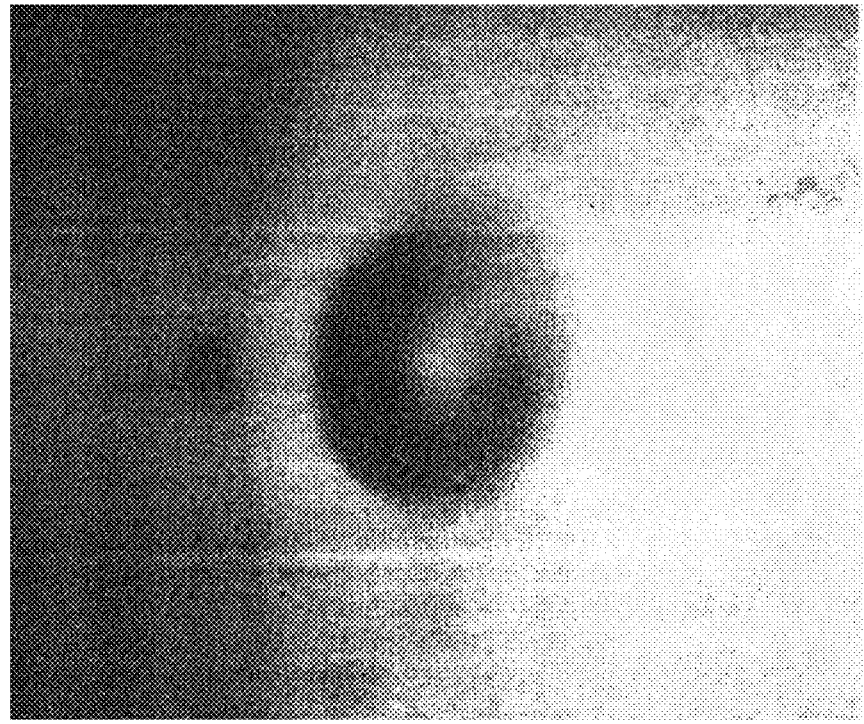
FIG. 7. is a picture of the same damage site shown in FIG. 5 after being treated by a $CO_2$ laser.
Figure 8:
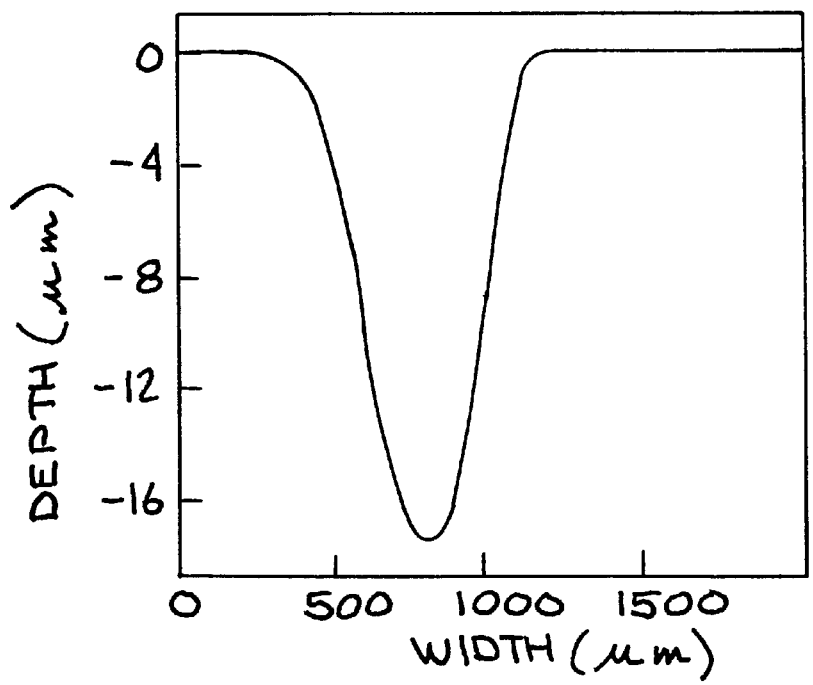
FIG. 8. illustrates a profile of the $CO_2$ laser treated site shown in FIG. 7.

A picture of the damage site after being treated by a $CO_2$ laser is shown in FIG. 7. The damage site has been completely smoothed out, as shown by the profile in FIG. 8.

In one embodiment a laser method is provided including the steps of irradiation of the local area with a carbon dioxide laser and operating at the fundamental Nd:YAG laser wavelength of 1.06 micrometers through and including the tripled Nd:YAG laser wavelength of 355 nanometers. Another embodiment includes scanning the optics to initiate small-scale damage sites and removing nanoscale impurities. The impurities are expelled by production of the damage sites with photon absorbing components and curing the damaged sites by smoothing out the damage sites photon absorbing components, annealing any cracks, and eliminating any absorbing species that could cause damage growth.

Figures 9, 10:
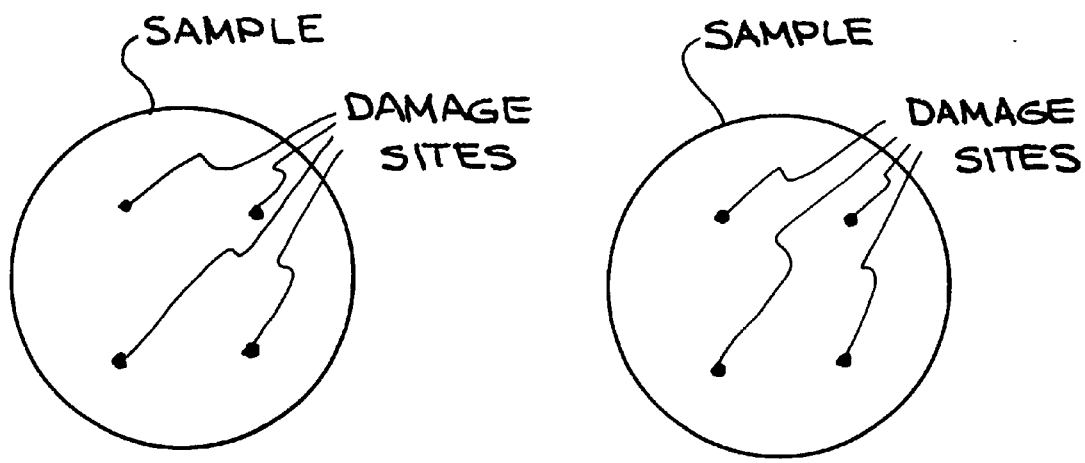
FIG. 9. shows a fused $SiO_2$ sample containing four damage sites.
FIG. 10. shows another fused $SiO_2$ sample containing four damage sites.

Several samples containing damage sites similar to that shown in FIG. 5 were treated to demonstrate the effectiveness of the approach described in this invention disclosure. FIG. 9 shows a sample that contained four damage sites. Three of the damage sites were treated using $CO_2$ laser and one was left untreated. After exposure of these sites to 0.35-micron laser at a beam average fluence of 8 $J/cm^2$, the untreated site grew immediately. The treated sites survived over 1000 shots at the same fluence level. The test results are summarized in Table I. FIG. 10 shows another sample containing four damage sites. The test results on this sample are summarized in Table II. Note that damage growth was stopped in all of the treated sites.

TABLE I

| TREATMENT | | DAMAGE TEST RESULT |
|---|---|---|
| Site A | CO2 Laser Ablated 50W, 1s, 0.8"def Ablated Pit: 50 μm deep, 1.3 mm wide | Survived 1000 shots @ ~8 J/cm2 No staining, no growth. |
| Site B | CO2 Laser Ablated 50W, 1s, 0.8"def Ablated Pit: 45 μm deep, 1.3 mm wide Had debris around pit. | Survived 1000 shots @ ~8 J/cm2 No staining, no growth. |

TABLE I-continued

| TREATMENT | | DAMAGE TEST RESULT |
|---|---|---|
| Site C | Damage site left untreated | Damage grew from 400 μm to 2 mm diameter in 35 shots. |
| Site D | CO2 Laser Ablated 50W, 1s, 0.8"def Ablated Pit: 46 μm deep, 1.3 mm wide | Survived 1000 shots @ ~8 J/cm2 No staining, no growth. Had apparent particulates, but cleaned up in 4 shots. |

TABLE II

| TREATMENT | | DAMAGE TEST RESULT |
|---|---|---|
| Site A | CO2 Laser Ablated 37W, 1s, 0.8"def Ablated Pit: 25 μm deep, 1 mm wide No fluorescence | Survived 1000 shots @ ~8 J/cm2 No staining, no growth. |
| Site B | CO2 Laser Ablated 37W, 1s, 0.8"def Ablated Pit: 25 μm deep, 1 mm wide Had fluorescence 130 μm below surface. | Survived 1000 shots @ ~8 J/cm2 No staining, no growth. |
| Site C | CO2 Laser Ablated 37W, 1s, 0.8"def Ablated Pit: 25 μm deep, 1 mm wide Had multiple small fluorescence around the edge. | Survived 1000 shots @ ~8 J/cm2 No staining, no growth. |
| Site D | Damage site left untreated | Damage grew from 300 μm to 3 mm diameter in 32 shots. |

Damage sites treated by the $CO_2$ laser were also exposed to 0.35-micron laser at a beam average fluence of 12 $J/cm^2$. In all cases, the treated sites survived over 1000 shots. $CO_2$ laser treatment has been completely successful in stopping damage growth in fused silica under exposure to 0.35-micron laser at a beam average fluence ranging from 8 to 12 $J/cm^2$. In comparison, damage in the untreated sites grew quickly to approximately 3 mm after 35 shots at 8 $J/cm^2$. Illumination by a continuous-wave $CO_2$ laser for one second at power levels less than 50 watts eliminated all signs of the original damage pits, leaving a single smooth pit.

Figure 11:
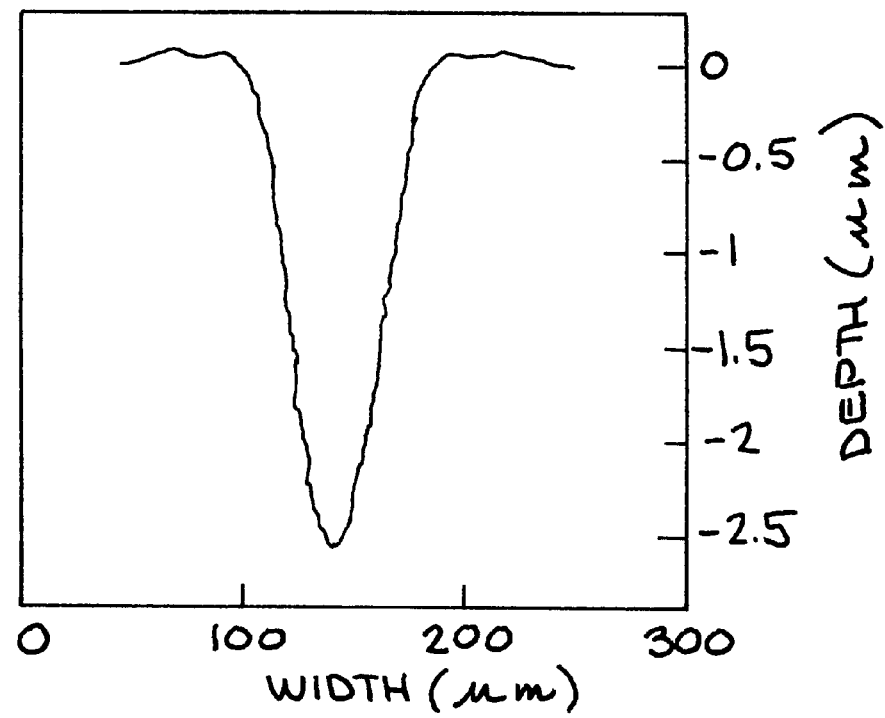
FIG. 11. illustrates a profile of a site treated with a low-power focused $CO_2$ laser.

The focus and power level of the $CO_2$ laser can be adjusted to produce treatment pits as shallow as tenths of a micron and diameters of less than a hundred microns. The size and shape of the treatment spots can be adjusted to whatever is required to avoid any beam modification that could cause downstream problems in the laser chain of the high power ultraviolet laser. FIG. 11 shows a profile of site treated with a low-power (about 50 milliwatts, exposure time of 0.1 seconds), focused (laser beam diameter of around 500 microns) $CO_2$ laser. Note that treatment sites with diameter as low as 85 microns have been achieved. The small diameter of such a treatment site eliminates possible beam propagation problems due to the treatment pit on the exit side of the optics.

Figure 12A:
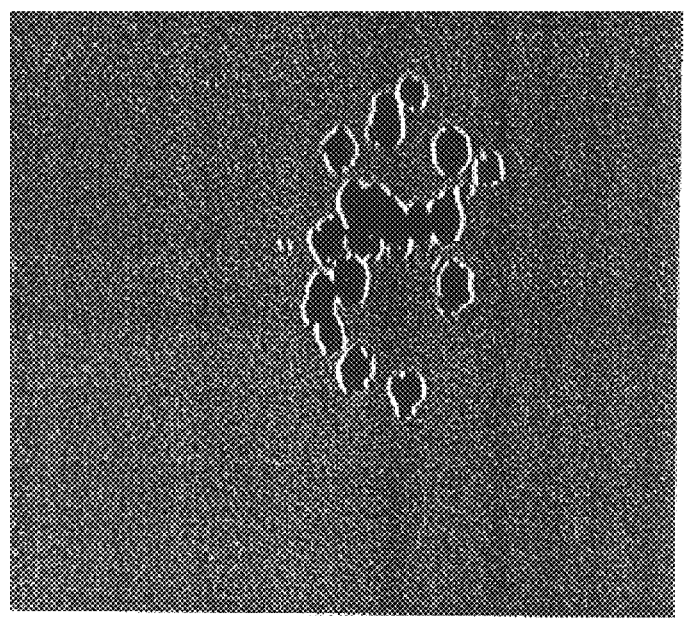
FIGS. 12A and 12B are pictures of a damage site before and after minimal excavation treatment with a low-power slightly-defocused $CO_2$ laser.
Figure 12B:
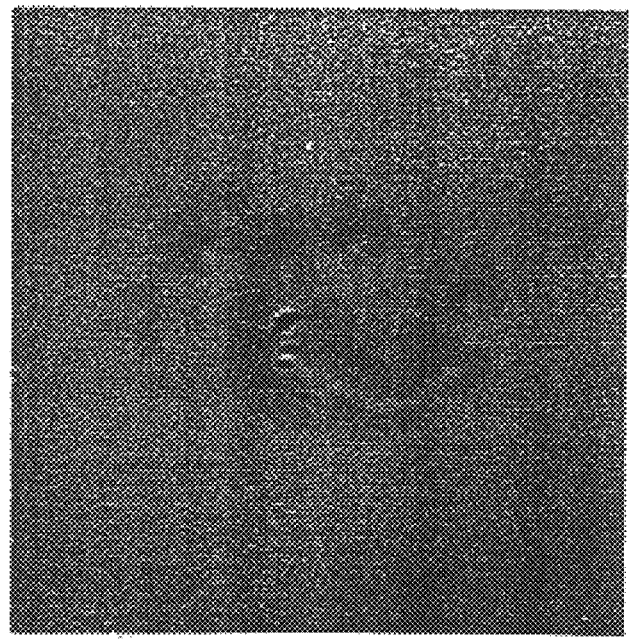

A much less intrusive technique for halting damage growth was also demonstrated. Minimal excavation (less than 0.5 micron deep) was shown to be as effective as full excavation (mitigation pit as deep as the damage pit) for stopping the growth of heavily-initiated damage sites. Sites mitigated by minimal excavation showed no growth for 1000 shots at 12 $J/cm^2$. FIG. 12 shows the picture of a damage site before and after minimal excavation treatment with a slightly defocused $CO_2$ laser.

The present invention provides a optic for operation at the fundamental Nd:YAG laser wavelength of 1.06 micrometers through and including the tripled Nd:YAG laser wavelength of 355 nanometers produced by the method of reducing or eliminating the growth of laser damage sites in the optics by processing the optics to stop damage in the optics from growing to a predetermined critical size. One embodiment is produced by etching the damage sites with an electrical discharge plasma. Another embodiment is produced by local removal of glass and absorbing material via electrical discharge plasma etching. Another embodiment is produced by removing local surface height variations in the area and rendering the area more smooth by use of electrical discharge plasma etching. Another embodiment is produced by elimination of cracks emanating from the initial laser damage sites performed by chemical etching of the glass material matrix by electrical discharge plasma etching. Another embodiment is produced by imposing compressive stress into the uppermost layer of the optics and rendering flaws within the compressive stress layer in such a state that they may not grow. Another embodiment is produced by local removal of glass and absorbing material via carbon dioxide laser irradiation. Another embodiment is produced by depositing silica on the damage sites with an electrical discharge plasma. Another embodiment is produced by illuminating the damage sites using a small aperture $CO_2$ laser beam. In another embodiment the beam delivers up to 200 watts of power in a beam up to 10 mm in diameter. In another embodiment the beam is focused into an area between 20 and 1500 microns in diameter. In another embodiment the beam has a beam spatial profile that is smooth Gaussian. In another embodiment the beam possess a beam power stability of $\leq 1\%$.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of reducing or eliminating the growth of laser damage sites in optics when said optics are subsequently operated at the fundamental Nd:YAG laser wavelength of 1.06 micrometers through and including the tripled Nd:YAG laser wavelength of 355 nanometers, comprising the steps of:

processing said optics to stop damage in said optics from growing to a predetermined critical size.

2. The method of reducing or eliminating the growth of laser damage sites in optics of claim 1, wherein said step of processing said optics to stop damage in said optics from growing to a predetermined critical size includes etching the damage sites with an electrical discharge plasma.

3. The method of reducing or eliminating the growth of laser damage sites in optics of claim 1, wherein said step of processing said optics to stop damage in said optics from growing to a predetermined critical size includes local removal of glass and absorbing material via electrical discharge plasma etching.

4. The method of reducing or eliminating the growth of laser damage sites in optics of claim 1, wherein said step of processing said optics to stop damage in said optics from growing to a predetermined critical size includes mitigating said growth of laser damage sites in optics by virtue of modification of the local structure of the glass in the affected area, removing local surface height variations in said area, and rendering the area more smooth by use of electrical discharge plasma etching.

5. The method of reducing or eliminating the growth of laser damage sites in optics of claim 1, wherein said step of processing said optics to stop damage in said optics from growing to a predetermined critical size includes mitigating said growth of laser damage sites in optics by virtue of elimination of cracks emanating from the initial laser damage sites performed by chemical etching of the glass material matrix by electrical discharge plasma etching.

6. The method of reducing or eliminating the growth of laser damage sites in optics of claim 1, wherein said step of processing said optics to stop damage in said optics from growing to a predetermined critical size includes mitigating said growth of laser damage sites in optics by virtue of modification of the local distributions of stress in the glass matrix by imposing compressive stress into the uppermost layer of the optics and rendering flaws within said compressive stress layer in such a state that they may not grow.

7. The method of reducing or eliminating the growth of laser damage sites in optics of claim 1, wherein said step of processing said optics to stop damage in said optics from growing to a predetermined critical size includes local removal of glass and absorbing material via carbon dioxide laser irradiation.

8. The method of reducing or eliminating the growth of laser damage sites in optics of claim 1, wherein said step of processing said optics to stop damage in said optics from growing to a predetermined critical size includes mitigating damage in optics by virtue of elimination of cracks emanating from the initial laser damage sites performed by irradiation of the local area with a carbon dioxide laser.

9. The method of reducing or eliminating the growth of laser damage sites in optics of claim 1, wherein said step of processing said optics to stop damage in said optics from growing to a predetermined critical size includes depositing silica on the damage sites with an electrical discharge plasma.

10. The method of reducing or eliminating the growth of laser damage sites in optics of claim 1, wherein said step of processing said optics to stop damage in said optics from growing to a predetermined critical size includes illuminating the damage sites using a small aperture $CO_2$ laser beam.

11. The method of reducing or eliminating the growth of laser damage sites in optics of claim 10, wherein said step of illuminating the damage sites using a small aperture $CO_2$ laser beam includes delivering up to 200 watts of power in a beam up to 10 mm in diameter.

12. The method of reducing or eliminating the growth of laser damage sites in optics of claim 11, wherein said step of delivering up to 200 watts of power in a beam up to 10 mm in diameter includes focusing said beam into an area between 20 and 1500 microns in diameter.

13. The method of reducing or eliminating the growth of laser damage sites in optics of claim 12, wherein said beam has a beam spatial profile that is smooth Gaussian.

14. The method of reducing or eliminating the growth of laser damage sites in optics of claim 13, wherein said beam has a beam possess a beam power stability of $\leq 1\%$.

15. The method of reducing or eliminating the growth of laser damage sites in optics of claim 14, wherein the focus and power level of said $CO_2$ laser is adjusted to produce treatment pits as shallow as tenths of a micron and diameters of less than a hundred microns.

16. A method of reducing or eliminating the growth of laser damage sites in optics when said optics are subsequently operated at the fundamental Nd:YAG laser wavelength of 1.06 micrometers through and including the tripled Nd:YAG laser wavelength of 355 nanometers, comprising the steps of:

scanning said optics to initiate small-scale damage sites and remove nanoscale impurities, expulsion of said impurities and/or production of damage sites with photon absorbing components, and curing said damaged sites by smoothing out said damage sites photon absorbing components, annealing any cracks, and eliminating any absorbing species that could cause damage growth.

17. A laser method comprising the steps of:

processing said optics to stop damage in said optics from growing to a predetermined critical size by etching the damage sites with an electrical discharge plasma, and operating at the fundamental Nd:YAG laser wavelength of 1.06 micrometers through and including the tripled Nd:YAG laser wavelength of 355 nanometers.

18. A laser method comprising the steps of:

processing said optics to stop damage in said optics from growing to a predetermined critical size by mitigating damage in said optics by virtue of elimination of cracks emanating from the initial laser damage sites by irradiation of the local area with a carbon dioxide laser, and operating at the fundamental Nd:YAG laser wavelength of 1.06 micrometers through and including the tripled Nd:YAG laser wavelength of 355 nanometers.

19. The laser method of claim 18, wherein said step of irradiation of the local area with a carbon dioxide laser uses a small aperture $CO_2$ laser beam.

20. The laser method of claim 18, wherein said step of irradiation of the local area with a carbon dioxide laser delivers up to 200 watts of power in a beam up to 10 mm in diameter.

21. The laser method of claim 20, wherein said carbon dioxide laser delivers up to 200 watts of power in a beam up to 10 mm in diameter focused into an area between 20 and 1500 microns in diameter.

22. The laser method of claim 21, wherein said beam has a beam spatial profile that is smooth Gaussian.

23. The laser method of claim 22, wherein said beam has a beam possesses a beam power stability of $\leq 1\%$.

* * * * *